US007773514B2

(12) United States Patent
Kaminski et al.

(10) Patent No.: US 7,773,514 B2
(45) Date of Patent: Aug. 10, 2010

(54) RESILIENT FLOW CONTROL SYSTEMS AND METHODS

(75) Inventors: Krzysztof J. Kaminski, Pomorskie (PL); Pawel O. Matusz, Pomorskie (PL)

(73) Assignee: Intel Corporation, Santa Clara, CA (US)

( * ) Notice: Subject to any disclaimer, the term of this patent is extended or adjusted under 35 U.S.C. 154(b) by 1796 days.

(21) Appl. No.: 10/888,440

(22) Filed: Jul. 9, 2004

(65) Prior Publication Data

US 2006/0009995 A1 Jan. 12, 2006

(51) Int. Cl.
*G06F 11/00* (2006.01)
*G06F 15/16* (2006.01)
*H04Q 7/20* (2006.01)

(52) U.S. Cl. .................... 370/230.1; 370/235; 455/525; 709/229

(58) Field of Classification Search ......... 370/229–252, 370/310–342, 395.4, 442; 455/405, 406, 455/466, 512, 515, 574, 422.1, 439, 426.1, 455/440, 450, 452.1, 511, 525, 571; 709/219–238; 714/749, E11.022; 705/1
See application file for complete search history.

(56) References Cited

U.S. PATENT DOCUMENTS

| | | | | |
|---|---|---|---|---|
| 6,400,695 | B1 * | 6/2002 | Chuah et al. | 370/310 |
| 6,564,060 | B1 * | 5/2003 | Hoagland | 455/450 |
| 6,850,759 | B2 * | 2/2005 | Van Lieshout et al. | 455/426.1 |
| 7,113,480 | B2 * | 9/2006 | Kato | 370/235 |
| 7,277,944 | B1 * | 10/2007 | Davie et al. | 709/226 |
| 7,676,223 | B2 * | 3/2010 | Das et al. | 455/422.1 |
| 2002/0036983 | A1 * | 3/2002 | Widegren et al. | 370/230.1 |
| 2002/0072363 | A1 * | 6/2002 | Riihinen et al. | 455/432 |
| 2002/0083185 | A1 * | 6/2002 | Ruttenberg et al. | 709/232 |
| 2002/0094817 | A1 * | 7/2002 | Rune et al. | 455/450 |
| 2003/0084364 | A1 * | 5/2003 | Jakubiec | 713/500 |
| 2009/0191924 | A1 * | 7/2009 | Tamura et al. | 455/571 |

* cited by examiner

*Primary Examiner*—Afsar M. Qureshi
(74) *Attorney, Agent, or Firm*—Pillsbury Winthrop Shaw Pittman LLP

(57) ABSTRACT

Systems and methods are disclosed for providing resilient flow control in the context of the Universal Mobile Telecommunication System (UMTS) and in other contexts. In one embodiment, a method is provided for managing access to a network resource such as a forward access channel. Upon receiving a request from an entity such as a radio network controller to use the network resource, a set of credits is allocated to the entity. Periodically, the credits that have been allocated are reviewed, and revoked if they have not been used within a predefined period of time.

28 Claims, 7 Drawing Sheets

RESILIENT FLOW CONTROL SYSTEMS AND METHODS

BACKGROUND

Advances in computing and networking technology have led to the development of new and increasingly complex communications networks. Today, for example, systems such as the Universal Mobile Telecommunications System (UMTS) seek to provide cellular telephones, personal computers, and other computing devices with wireless access to the Internet and other networks.

In network communications systems, data is typically transmitted in packages called "packets" or "frames," which may be routed over a variety of intermediate network nodes before reaching their destination. These intermediate nodes (e.g., controllers, base stations, routers, switches, and the like) are often complex computer systems in their own right, and may include a variety of specialized hardware and software components.

Often, multiple network elements will make use of a single resource. For example, multiple servers may attempt to send data over a single channel. In such situations, resource allocation, coordination, and management are important to ensure the smooth, efficient, and reliable operation of the system, and to protect against sabotage by malicious users.

BRIEF DESCRIPTION OF THE DRAWINGS

Reference will be made to the following drawings, in which.

DESCRIPTION OF SPECIFIC EMBODIMENTS

Systems and methods are disclosed for providing resilient flow control in the context of the Universal Mobile Telecommunication System (UMTS) and in other contexts. It should be appreciated that these systems and methods can be implemented in numerous ways, several examples of which are described below. The following description is presented to enable any person skilled in the art to make and use the inventive body of work. The general principles defined herein may be applied to other embodiments and applications. Descriptions of specific embodiments and applications are thus provided only as examples, and various modifications will be readily apparent to those skilled in the art. For example, although several examples are provided in the context of the Universal Mobile Telecommunication System, it will be appreciated that the same principles can be readily applied in other contexts as well. Accordingly, the following description is to be accorded the widest scope, encompassing numerous alternatives, modifications, and equivalents. For purposes of clarity, technical material that is known in the art has not been described in detail so as not to unnecessarily obscure the inventive body of work.

Resource allocation and security are important considerations in many communications and computing environments. An example of such an environment is the Universal Mobile Telecommunications System (UMTS) developed by the 3$^{rd}$ Generation Partnership Project (3GPP). UMTS is an implementation of the third-generation (3G) wireless telecommunication system and offers service in the 2 GHz band with global roaming and personalized features.

Figure 1:
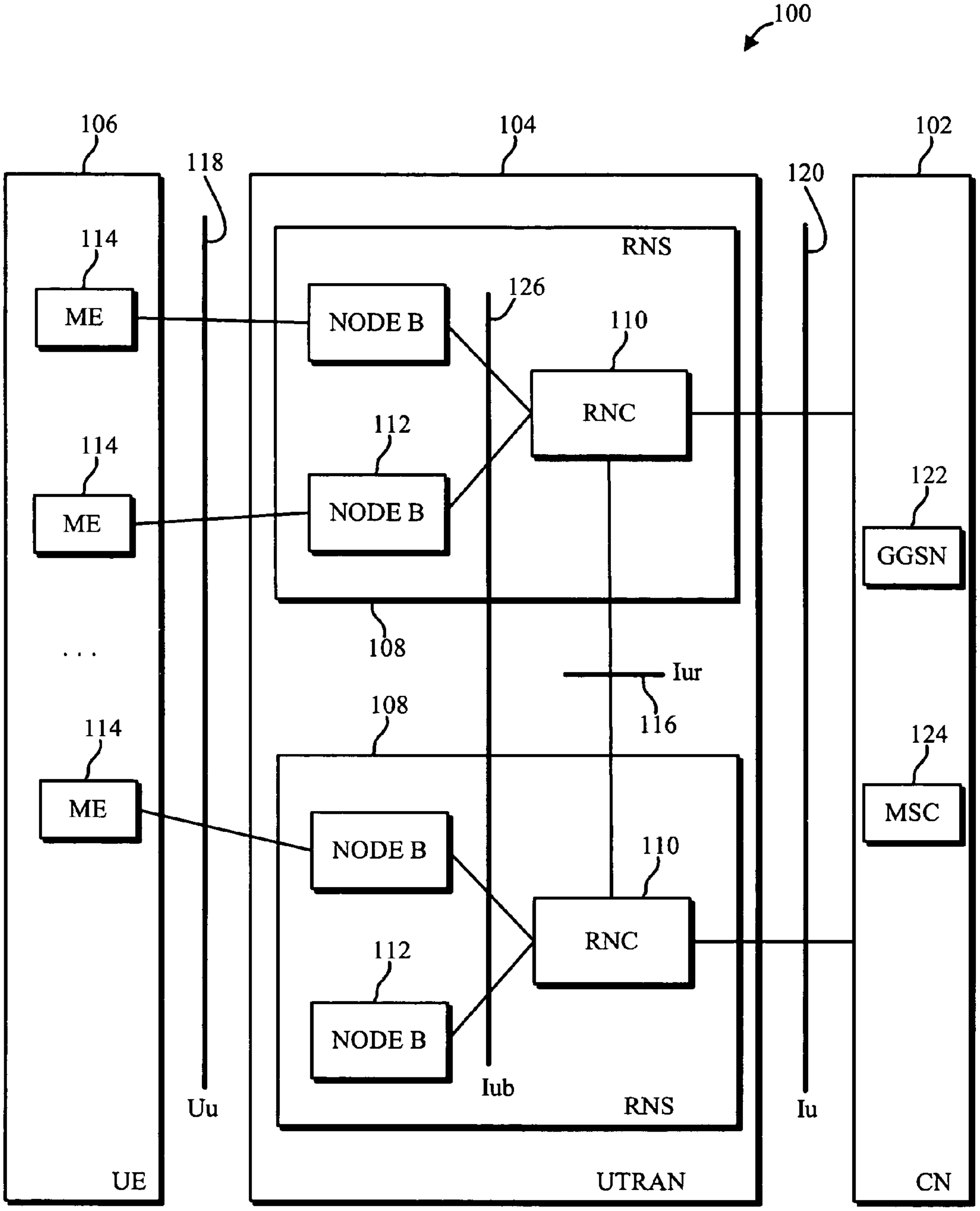
FIG. 1 is an illustration of an embodiment of the Universal Mobile Telecommunication System.

FIG. 1 is a diagram of an embodiment of the UMTS. As shown in FIG. 1, a UMTS system 100 can be functionally divided into three principal parts: user equipment (UE) 106, which includes users' mobile equipment (ME) 114 (e.g., cellular telephones, laptop computers, and/or the like); a UMTS Terrestrial Radio Access Network (UTRAN) 104 for handling radio-related functionality; and a Core Network (CN) 102 responsible for switching and routing calls and data connections to external networks such as the Internet and the public switched telephone network (PSTN). Several interfaces 116, 118, 120, 126 connect the various parts of the system, and the user, management, and signaling data that is exchanged between the various system elements is typically passed through these interfaces using data frames. For example, communication across interfaces 116, 120, 126, respectively, is generally conducted using asynchronous transport mode (ATM) or Internet protocol (IP) frames.

As shown in FIG. 1, UTRAN 104 is divided into a number of radio network systems (RNSs) 108, each of which is typically controlled by a radio network controller (RNC) 110. The RNCs are connected to, and perform control operations for, one or more base stations (Nodes B) 112 that typically serve one or more cells in a cellular network.

RNCs 110 communicate with each other over the Iur interface 116, and handle protocol exchanges between the various other interfaces as well as enabling UTRAN 104 to perform autonomous radio resource management.

The user equipment (UE) 106 portion of the architecture includes a variety of mobile equipment (ME) 114, such as cellular telephones, pagers, laptop computers, and the like. Mobile equipment 114 communicates with network base stations 112 via radio transmissions over UMTS air interface, Uu 118.

The core network (CN) 102 typically includes equipment for performing circuit and packet switching. For example, core network 102 may include one or more mobile switching centers (MSCs) 124 for enabling communication over the public switched telephone network (PSTN). Core network 102 may also include a gateway general packet radio service (GPRS) support node (GGSN) 122 for interfacing to external packet-based networks such as the Internet.

Often, multiple radio network controllers (RNCs) 110 will need to communicate over a single channel. For example, multiple serving RNCs (SRNCs) may attempt to communicate with a base station (Node B) 112 via a forward access channel (FACH) using ATM frames. In this situation, a controlling RNC (CRNC) may be used to manage the transmission of data over the channel in order to ensure that the data transmitted by the SRNCs does not exceed the channel's capacity.

Figure 2:
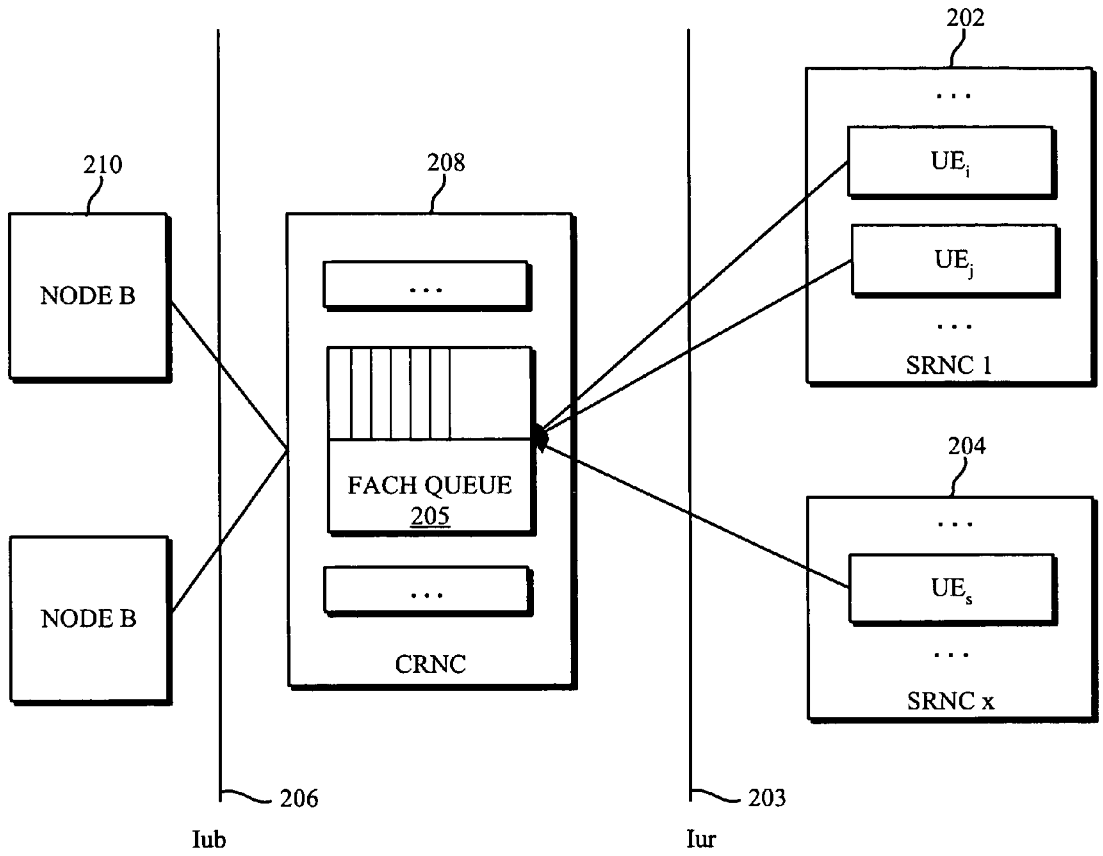
FIG. 2 is an illustration of servers sharing a communications channel.

FIG. 2 is an illustration of two SRNCs 202, 204 communicating with a controlling RNC (CRNC) 208 over inter-RNC interface Iur 203. CRNC 208 manages the flow of data from SRNCs 202, 204, as SRNCs 202, 204 compete to send data to CRNC 208 for communication to Node B 210, from which it will be transmitted to various user equipment.

As shown in FIG. 2, CRNC 208 may maintain multiple queues 205 (e.g., 16 queues) for the FACH channel. For a given queue, the CRNC 208 buffers data from SRNCs 202, 204 until it can be sent over the Iub interface 206 to Node B 210.

Figure 3:
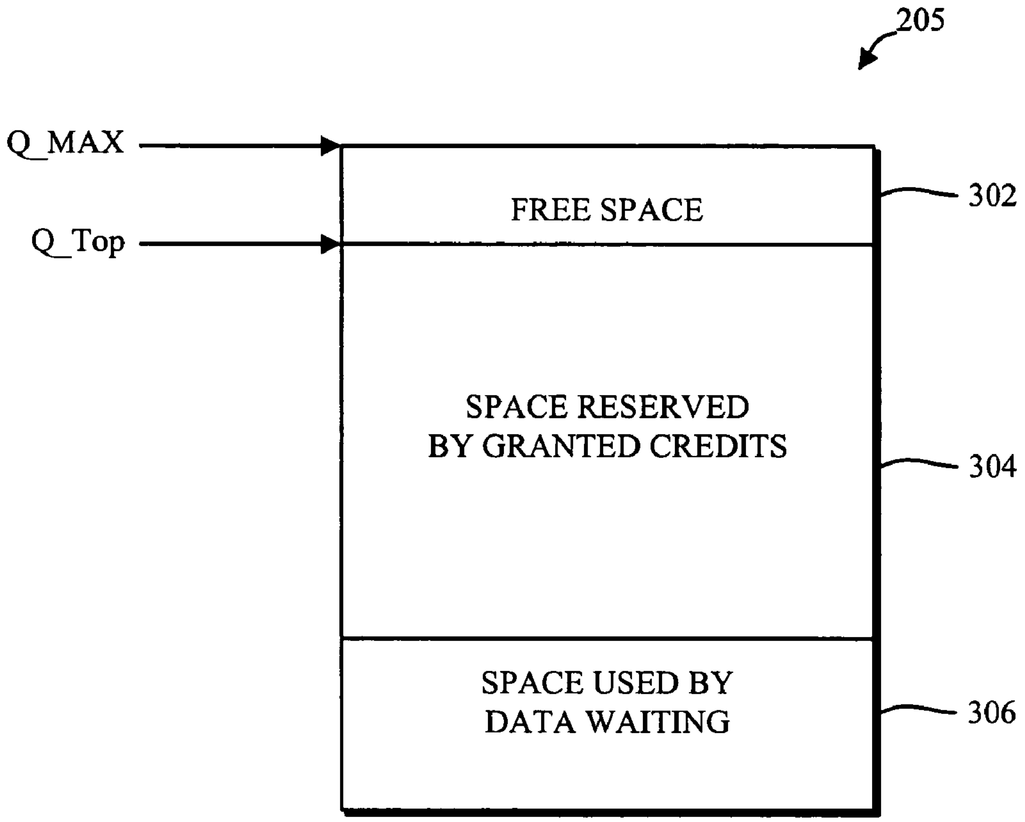
FIG. 3 is an illustration of a traffic queue for the communications channel shown in FIG. 2.

As shown in FIG. 3, because resources are constrained, a queue 205 can hold only a certain amount of data (Q_MAX). One mechanism for managing the SRNCs 202, 204 so as to prevent dropping data, is to allocate credits or permissions to send a certain amount of data on the FACH channel. Each SRNC obtains credits before sending data to the CRNC. When an SRNC (or "client") requests credits, the CRNC determines if there is any remaining capacity on the transport channel (e.g., by comparing Q_Top with Q_MAX), and, if there is excess capacity, allocates a certain amount to the requesting SRNC (e.g., optionally taking into account factors such as the priority of the request and/or the requesting client).

When all the buffers in the CRNC's queue 205 are filled or reserved (e.g., when Q_Top equals Q_MAX), the CRNC ceases issuing credits, and a requesting SRNC will need to wait for credits to be consumed and de-allocated, at which point the CRNC will resume issuing credits in response to requests. As shown in FIG. 3, the CRNC may keep track of the amount of data in the queue 306, as well as the number of credits given to each SRNC 304, in order to avoid issuing more credits than the queue has the capacity to handle. The SRNCs send data to the CRNC after receiving enough credits, and consume their credits in the process. When an SRNC wants to send additional data, it requests additional credits. In this way, the flow control algorithm manages the credits on the Iur interface.

A potential problem with an approach such as that described above is that if credits are lost or remain unused, the CRNC can effectively run out of credits to issue, and the data flowing over the Iur and Iub interfaces will stop. For example, consider the situation in which some SRNCs request credits but do not consume them. As can be seen in FIG. 3, in such a situation the reserved space 304 will remain used and the dynamic capacity of the queue will be effectively decreased, and, in the worst case, completely consumed (i.e., if Q_Top equals Q_MAX, then there will be no free space 302). When all of the CRNC's buffers are wasted in this way, the CRNC will be unable to grant additional credits, resulting in a denial of service. Such a denial of service can be caused by any of a variety of factors, including:

- a defective flow control algorithm on the SRNC and/or CRNC;
- a failure of the flow control frames conveying the granted credits to reach the SRNCs; and/or
- a malicious hacker launching a denial-of-service attack by injecting specially prepared or previously captured frames containing requests for credits.

Denials-of-service can cause large financial losses in the telecommunications business, as they can result in loss of data, slower processing times, and/or customer dissatisfaction.

In one embodiment, these problems are addressed by providing a mechanism by which unused credits expire, thereby enabling credits that have been lost or hoarded to be replenished and reissued to SRNCs that need, and are able, to make use of them. In one embodiment the CRNC maintains a record of the number of credits granted to each SRNC (or "client"), and the time when the credits were granted. After a predetermined amount of time has elapsed, the credits are withdrawn. In this way, credits that have not been consumed can be granted to another SRNC, in which case the SRNC that did not consume them in time will need to request the credits again if it later wants to send data over the channel.

Figure 4:
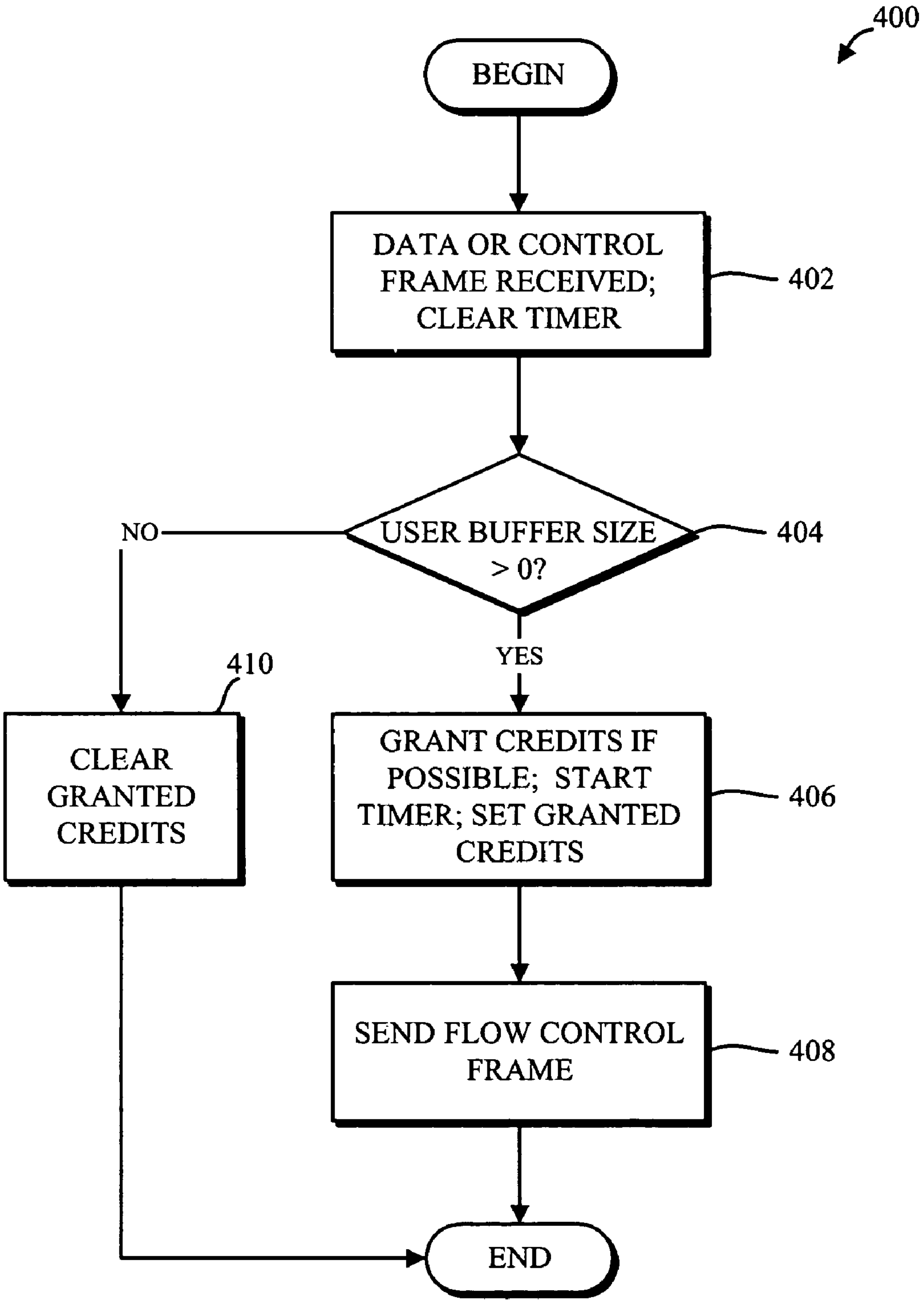
FIG. 4 is a flowchart of one aspect of an illustrative technique for managing communication over the channel shown in FIG. 2.

FIG. 4 shows an illustrative flow control algorithm 400 such as that described above. As shown in FIG. 4, each time the CRNC receives a frame (e.g., a control frame) from an SRNC (or "client"), the CRNC's record for that client is updated and a timer associated with the client is cleared (e.g., set to zero) (block 402). If the client has requested more credits (e.g., if the user buffer size specified by the incoming frame is greater than zero) (i.e., a "Yes" exit from block 404), then the CRNC determines whether there are sufficient credits available to grant the request. If there are sufficient credits, then the credits are allocated to the client, the client's timer is started, and the CRNC updates its record for the client accordingly (block 406). A flow control frame indicating that the credits were granted is then sent from the CRNC to the client (block 408). Usually, when a client submits a request, it has data to send, so when it receives an allocation of credits in the flow control frame, it will begin sending data.

Referring once again to FIG. 4, if the frame from the client indicates that the client's user buffer is empty (i.e., a "No" exit from block 404), the CRNC then clears any credits that were previously granted to the client (block 410). This situation might occur, for example, if a client determines that it does not need to send data that it previously intended to send, as might be the case if the data became obsolete. Upon making this determination, the client might discard the data from its user buffer and send a control frame to the CRNC, notifying it that the previously allocated credits are no longer needed, and can be released for use by other clients.

Figure 5:
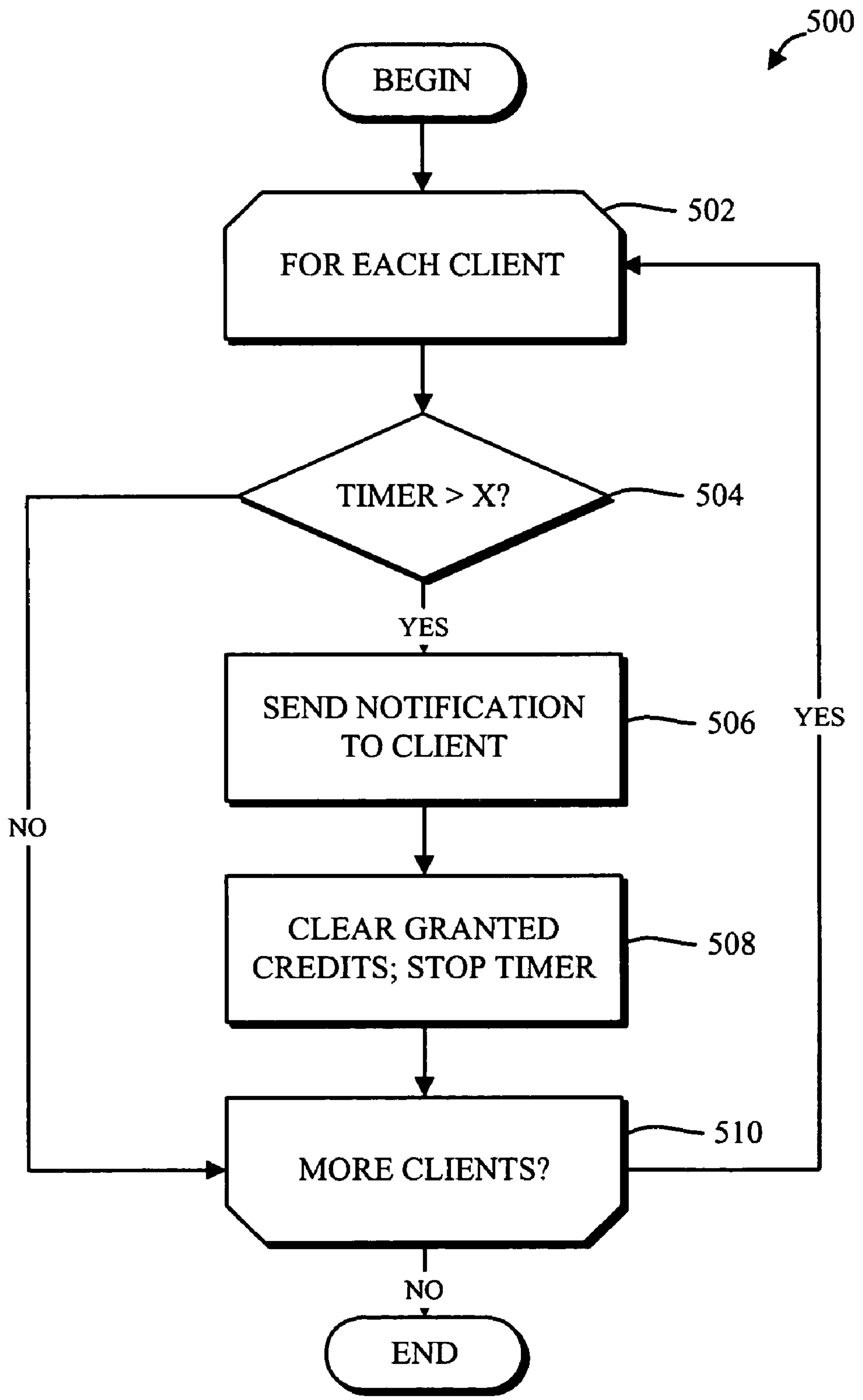
FIG. 5 is a flowchart of another aspect of an illustrative technique for managing communication over the channel shown in FIG. 2.

Following the process shown in FIG. 4 (or independently and/or in parallel therewith), the CRNC will periodically execute the process 500 shown in FIG. 5 to determine if a particular client's credits should be revoked. Specifically, as shown in FIG. 5, the CRNC periodically checks the records of each client (502-510), and when it determines that the timer for a certain client has expired (e.g., exceeded a predefined threshold) (i.e., a "Yes" exit from block 504)—indicating that the client has not consumed the credits that it was previously allocated—the CRNC revokes the credits by, e.g., sending the client a flow control frame with a credits value set to 0 (block 506). The CRNC then clears its record of the credits allocated to the client, and stops the client's timer (block 508). This process (blocks 504-510) is repeated for each client, or at least for those clients for which an active record is stored. The timer period should be set to a value that ensures that a correctly operating client will have sent its data in such period. On the other hand, setting the timer period to too large a value can cause unnecessary delays in withdrawing unused or incorrectly granted credits.

It should be appreciated that FIGS. 4 and 5 are provided for purposes of illustration, and not limitation, and that the systems and methods described in connection therewith can be practiced with processes and architectures that lack some of the features shown or described in connection with FIGS. 4 and 5, and/or that have other features. For example, in some embodiments some of the actions shown in FIGS. 4 and 5 could be combined and/or performed in a different order. For example, in some embodiments the order of blocks 506 and 508 could be reversed. As yet another example, in some embodiments different amounts of time could be allocated to different SRNCs, based, for example, on the relative priorities of their requests.

It should also be appreciated that the basic principles described in connection with FIGS. 4 and 5 are readily adaptable for broader application. For example, FIG. 6 illustrates an embodiment of a flow control algorithm in which a single timer (or a small set of timers) can be used by a CRNC or server to monitor all of the clients (as opposed to maintaining a separate timer for each client), while achieving similar results to the techniques described in connection with FIGS. 4 and 5.

In one such embodiment, the server maintains a table with an entry for each client. Each entry contains an indication of the amount of credits (if any) granted to the client, and two flags: timer flag A and timer flag B. Timer flag A is set when the CRNC allocates credits to the client. Timer flag B is set the next time the CRNC checks the client's entry in the table. The CRNC also maintains a timer.

Figure 6:
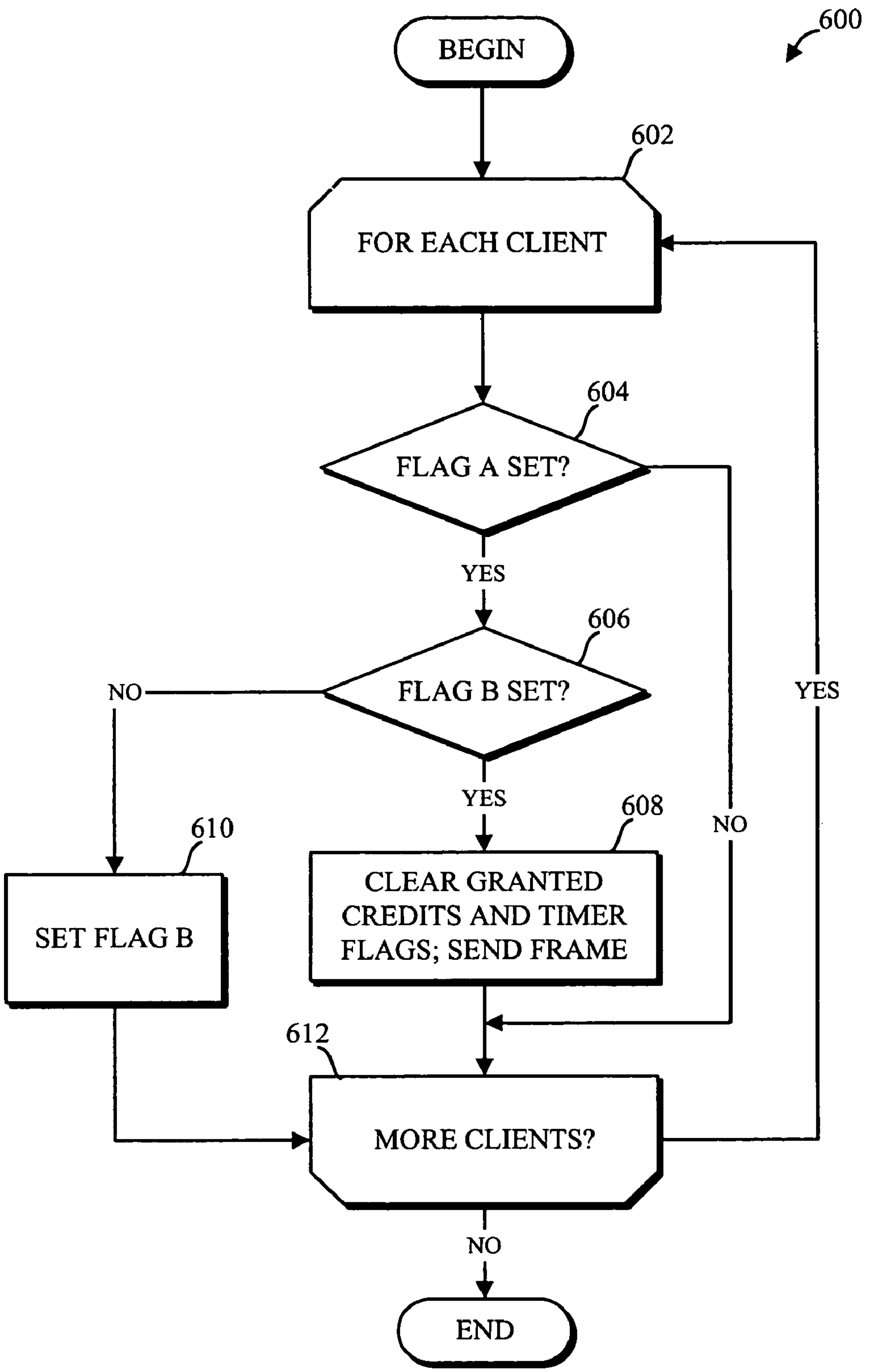
FIG. 6 is a flowchart of another illustrative technique for managing communication over a channel such as that shown in FIG. 2.

In one embodiment, each time a predefined period elapses (such as the period of the timer), the actions shown in FIG. 6 are performed for each entry in the table. Specifically, each client's record is checked to see if flag A is set (block 604). If flag A is not set (i.e., a "No" exit from block 604), this indicates that the client has not currently been allocated any credits, and processing continues with the next client's entry in the table (block 612).

If, on the other hand, flag A is set (i.e., a "Yes" exit from block 604), this indicates that credits have been previously allocated to the client. In this case, the client's record is checked to see if flag B is also set (block 606). If flag B is not set (i.e., a "No" exit from block 606), then the CRNC sets flag B (block 610) and moves on to the next client's entry in the table (block 612). If, however, flag B is set (i.e., a "Yes" exit from block 606), this indicates that the client's time to use any allocated credits has expired. Any remaining credits are then cleared, as are flags A and B, and a notification is sent to the client indicating that this has occurred (block 608). Processing then continues with the next client in the table (block 612). The effect of these actions is to effectively ensure that each client will possess credits for a time period of at least X ms, but less than 2X ms, where X is the predefined period at which the table is processed.

It will be appreciated that FIG. 6 is provided for purposes of illustration and not limitation, and that a number of changes can be made to the process described in connection therewith. For example, without limitation, in some embodiments the table could contain a single flag (flag B), and a check for a non-zero credit allocation could replace block 604. Alternatively, there could be several flags with a function similar to flag B, or flag B could be replaced by a counter that decreased every predefined period of time until it reached zero, which would be interpreted as having the same meaning as flag B being set. Alternatively, or in addition, in other embodiments a process similar to that shown in FIG. 4 could be performed in conjunction with the process shown in FIG. 6, in which a client's flag B would be cleared upon the CRNC's receipt of data and/or a new request for credits from the client.

Thus, embodiments of the systems and methods described herein can be used to provide more secure and resilient flow control in the face of network conditions that can cause the loss of credits (e.g., malfunctioning or improperly configured equipment, denial-of-service attacks launched by rogue RNCs, and/or the like), thus helping prevent system downtime and financial loss. In addition, in embodiments such as those described above in connection with FIGS. 4-6, it is possible to implement the flow control algorithm without making changes to the format of the FACH frames that are exchanged between the SRNCs and the CRNC in a UMTS environment. In other embodiments, a separate field could be added to, or designated within, the FACH frames sent from the CRNC to the SRNCs, the special field being operable to provide the SRNCs with an indication of the amount of time that the credits remain valid.

The systems and methods described above can be used in a variety of computer and network systems. For example, without limitation, the flow control algorithms described above, and/or some or all of the controlling and/or serving radio network controller's functionality, can be implemented using one or more network processors running on one or more servers.

Figure 7:
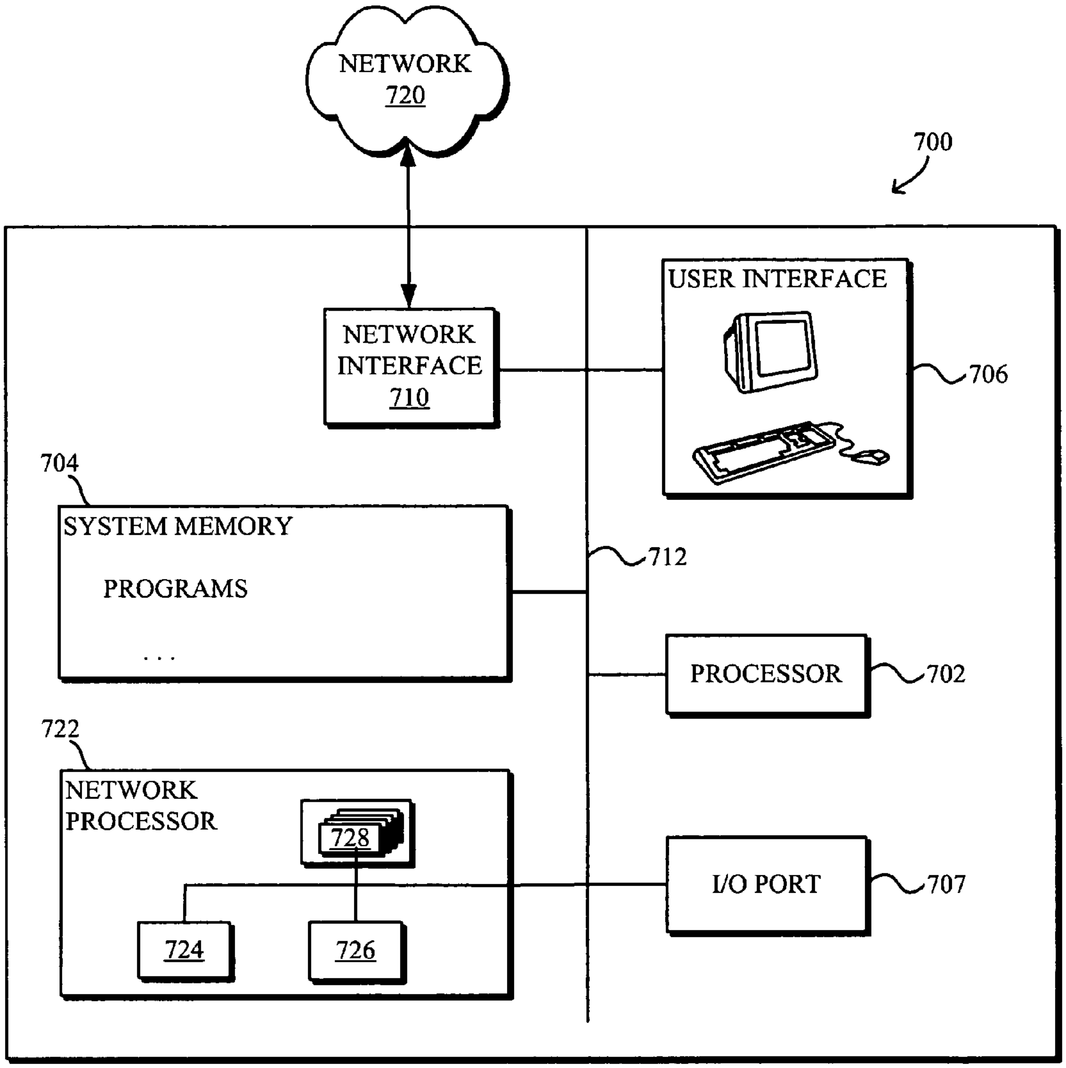
FIG. 7 is an illustration of a system for managing traffic flow in a Universal Mobile Telecommunication System.

FIG. 7 shows an example of such a computer system 700. As shown in FIG. 7, in one embodiment system 700 comprises a computing device such as a network server, and includes one or more processors 702, 722, memory 704, a user interface 706, a network interface 710, and a bus 712 for connecting the aforementioned elements. Network processor 722 may include its own internal memory 724, as well as a core processor 726 and one or more microengines 728 for performing various control plane and data plane operations.

The operation of system 700 will typically be controlled by processor 702 operating under the guidance of programs stored in memory 704. Memory 704 will generally include some combination of computer readable media, such as high-speed random-access memory (RAM) and non-volatile memory such as read-only memory (ROM), a magnetic disk, disk array, and/or tape array. Alternatively, or in addition, some aspects of the operation of system 700 may be controlled by network processor 722 using programs and/or data stored in memory 704 and/or the network processor's internal memory 724.

User interface 706 may, for example, comprise a keyboard, mouse, and/or the like for entering information, and one or more mechanisms such as a display, printer, speaker, and/or the like for presenting information to a user. Network interface 710 is typically operable to provide a connection between system 700 and other systems (and/or networks 720) via a wired, wireless, optical, and/or other connection. For example, if system 700 is operating as an RNC, or contains a network processor 722 operating as an RNC, network interface 710 could facilitate communication with other RNCs over an Iur interface, with Node Bs over an Iub interface, and/or with a Control Network over an Iu interface.

It should be appreciated that the systems and methods described herein can be practiced with devices and/or architectures that lack some of the components shown in FIG. 7 and/or that have other components that are not shown. Thus, it should be appreciated that FIG. 7 is provided for purposes of illustration and not limitation. For example, it should be appreciated that while, for purposes of illustration, system 700 is depicted as a single, general-purpose computing device such as a personal computer or a network server, in other embodiments system 700 could comprise one or more such systems operating together using distributed computing techniques. In such embodiments, some or all of the components and functionality depicted in FIG. 7 could be spread amongst multiple systems at multiple locations. It will be readily apparent that many similar variations could be made to the illustration shown in FIG. 7.

Thus, while several embodiments are described and illustrated herein, it will be appreciated that they are merely illustrative. Other embodiments are within the scope of the following claims.

What is claimed is:

1. A computer-implemented method for managing access to a network resource, the computer-implemented method comprising:

receiving a request from a first entity to use the network resource at a controlling radio network controller over an interface of a Universal Mobile Telecommunications System;

allocating a first set of credits to the first entity, the first set of credits being proportional to the use requested by the first entity, and having a magnitude that is less than or equal to an available capacity of the network resource;

setting a first timer flag when allocating the first set of credits;

reviewing a record of credits allocated to the first entity and setting a second timer flag at a predetermined time subsequent to the allocating the first set of credits; and periodically reviewing the record of credits allocated to the first entity, and revoking unused credits after passage of at least a predefined period of a time.

2. The computer-implemented method of claim 1, in which the resource comprises a forward access channel queue in a radio network controller of the Universal Mobile Telecommunications System.

3. The computer-implemented method of claim 2, in which the first entity comprises a server radio network controller.

4. The computer-implemented method of claim 1, in which periodically reviewing a record of the credits allocated to the first entity includes:

reviewing a timer associated with the first entity, the timer providing a measure of an amount of time that the first entity has had credits allocated to it.

5. The computer-implemented method of claim 1, in which periodically reviewing a record of the credits allocated to the first entity, and revoking unused credits after passage of at least a predefined period of time includes:

reviewing, for a first time, the record of credits allocated to the first entity;

detecting that the second flag is not set;

setting the second flag;

reviewing, for a second time, the record of credits allocated to the first entity;

detecting that the second flag is set; and revoking unused credits upon detecting that the second flag is set.

6. The computer-implemented method of claim 1, further comprising:

receiving a request from a second entity to use the network resource;

allocating a second set of credits to the second entity, the second set of credits being proportional to the use requested by the second entity, and having a magnitude that is less than or equal to the available capacity of the network resource; and periodically reviewing a record of credits allocated to the second entity, and revoking unused credits after passage of at least a predefined period of a time, wherein the second set of credits is allocated to the second entity at a time at which there are unused credits allocated to the first entity, and wherein the combined magnitude of the second set of credits and the unused credits allocated to the first entity is less than or equal to the available capacity of the network resource.

7. A computer-implemented method comprising:

allocating credits to a server radio network controller at a controlling radio network controller over an interface of a Universal Mobile Telecommunications System, the credits granting permission to send data to a forward access channel queue maintained by a controller radio network controller;

de-allocating credits that remain unused after at least a predefined interval of time; and performing a first check of whether credits allocated to the server radio network controller have been used, and if the credits have not been used, and performing a second check of whether the credits allocated to the server radio network controller have been used, and de-allocating the credits if the credits have not been used.

8. The computer-implemented method of claim 7, in which at least a predefined time interval separates the first check and the second check.

9. The computer-implemented method of claim 7, in which de-allocating credits comprises:

periodically checking a timer associated with the server radio network controller, and de-allocating the credits if the timer has a predefined value.

10. A computer-implemented method comprising:

receiving a first frame from a radio network controller at a controlling radio network controller over an interface of a Universal Mobile Telecommunications System;

clearing a timer associated with the radio network controller;

determining whether the first frame includes a request for channel capacity;

if the first frame contains a request for channel capacity, allocating credits to the radio network controller, the credits representing a portion of the channel's available capacity, starting the timer, setting a first timer flag, and sending a second frame to the radio network controller indicating that credits have been allocated;

reviewing a record of the credits allocated radio network controller;

setting a second timer flag; and revoking credits that are not used within a predefined period of time.

11. The computer-implemented method of claim 10, in which the channel comprises a forward access channel.

12. The computer-implemented method of claim 11, in which the first and second frames comprise asynchronous transfer mode frames.

13. The computer-implemented method of claim 10, in which revoking credits that are not used within a predefined period of time includes:

checking the timer, and, if the timer exceeds a predefined value, and revoking unused credits allocated to the radio network controller.

14. The computer-implemented method of claim 10, in which the timer comprises a counter that counts down from a predefined number, and in which revoking credits that are not used within a predefined period of time includes:

checking the timer, and, if the timer is less than or equal to a predefined value, and revoking unused credits allocated to the radio network controller.

15. A computer readable medium including instructions that, when executed by a processor, cause the processor to perform actions comprising:

allocating a first set of credits to a first radio network controller at a controlling radio network controller over an interface of a Universal Mobile Telecommunications System, the first set of credits being proportional to a use of a network resource requested by the first radio network controller, and having a magnitude that is less than or equal to an available capacity of the network resource;

setting a first timer flag when allocating the first set of credits;

reviewing a record of credits allocated to the first entity and setting a second timer flag at a predetermined time subsequent to the allocating the first set of credits; and periodically reviewing the record of credits allocated to the first radio network controller, and revoking unused credits after passage of at least a predefined period of a time.

16. The computer readable medium of claim 15, in which the resource comprises a forward access channel queue in a radio network controller of the Universal Mobile Telecommunications System.

17. The computer readable medium of claim 15, in which periodically reviewing a record of the credits allocated to the first radio network controller includes reviewing a timer associated with the first entity, the timer providing a measure of an amount of time that the first radio network controller has had unused credits allocated to it.

18. The computer readable medium of claim 15, in which periodically reviewing a record of the credits allocated to the first radio network controller, and revoking unused credits after passage of at least a predefined period of time includes:

reviewing, for a first time, the record of credits allocated to the first radio network controller and setting a flag; and reviewing, for a second time, the record of credits allocated to the first radio network controller, including detecting that the flag is set, and revoking unused credits upon detecting that the flag is set.

19. The computer readable medium of claim 15, further comprising:

receiving a request from a second radio network controller to use the network resource;

allocating a second set of credits to the second radio network controller, the second set of credits being proportional to the use requested by the second radio network controller, and having a magnitude that is less than the available capacity of the network resource; and periodically reviewing a record of credits allocated to the second radio network controller, and revoking unused credits after passage of at least a predefined period of a time, wherein the second set of credits is allocated to the second entity at a time at which there are unused credits allocated to the first entity, and wherein the unused credits allocated to the first entity and the second set of credits have a combined magnitude that is less than or equal to the available capacity of the network resource.

20. A computer readable medium including instructions that, when executed by a processor, cause the processor to perform actions comprising:

allocating credits to a server radio network controller, the credits granting permission to send data to a forward access channel queue maintained by a controller radio network controller; and de-allocating credits that remain unused after at least a predefined interval of time, the predefined interval of time being less than twice a minimum predefined interval of time for which the credits grant permission to send data.

21. The computer readable medium of claim 20, in which de-allocating credits comprises:

performing a first check of whether credits allocated to the server radio network controller have been used, and, if the credits have not been used, and performing a second check of whether the credits allocated to the server radio network controller have been used, and de-allocating the credits if the credits have not been used.

22. The computer readable medium of claim 20, in which at least a predefined time interval separates performance of the first check and the second check.

23. A network processor comprising:

a core processor;

one or more microengines;

a memory unit, the memory unit containing instructions that, when executed by the core processor or the microengines, cause the network processor to perform actions comprising:

allocating credits to a server radio network controller, the credits granting permission to send data to a forward access channel queue maintained by a controller radio network controller; and de-allocating credits that remain unused after at least a predefined interval of time, the predefined interval of time being less than twice a minimum predefined interval of time for which the credits grant permission to send data.

24. The network processor of claim 23, in which de-allocating credits comprises:

performing a first check of whether credits allocated to the server radio network controller have been used, and, if the credits have not been used, and performing, after at least a predefined time interval, a second check of whether the credits allocated to the server radio network controller have been used, and de-allocating the credits if the credits have not been used.

25. A system comprising:

a processor;

memory;

a network interface to facilitate communication with one or more cellular base stations;

a user interface;

a network processor, the network processor being operable to:

allocate credits to a server radio network controller, the credits granting permission to send data to a forward access channel queue maintained by a controller radio network controller set a first timer flag when allocating the credits;

review a record of credits allocated and set a second timer flag at a predetermined time subsequent to allocating the credits; and de-allocate credits that remain unused after at least a predefined interval of time, the predefined interval of time being less than twice a minimum predefined interval of time for which the credits grant permission to send data.

26. The system of claim 25, in which the network processor is operable:

perform a first check of whether credits allocated to the server radio network controller have been used, and, if the credits have not been used, and perform a second check of whether the credits allocated to the server radio network controller have been used, and de-allocate the credits if the credits have not been used.

27. A method comprising:

sending a request to a radio network controller to transmit a specified amount of data over a forward access channel;

receiving from the radio network controller a first message indicating that a set of credits has been allocated for transmitting the specified amount of data, the magnitude of the set of credits being proportional to the specified amount of data;

transmitting data over the forward access channel; and after passage of at least a predefined period of time, receiving a second message from the radio network revoking any unused credits in the set of credits, the predefined period of time being less than twice a minimum predefined interval of time for which the credits grant permission to transmit the specified data.

28. The method of claim 27, in which the request comprises forward access channel flow control frames.

* * * * *